Patented Jan. 26, 1926.                                                                                   1,571,002

UNITED STATES PATENT OFFICE.

ALFRED W. GAUGER AND HENRY HERMAN STORCH, OF WESTEND, CALIFORNIA, ASSIGNORS TO BURNHAM CHEMICAL COMPANY, OF RENO, NEVADA, A CORPORATION OF NEVADA.

PROCESS OF RECOVERING BORAX FROM SALINE LIQUORS.

No Drawing.   Application filed February 21, 1925.   Serial No. 10,957.

*To all whom it may concern:*

Be it known that we, ALFRED W. GAUGER and HENRY HERMAN STORCH, citizens of the United States, and residents of Westend, county of San Bernardino, State of California, have invented a certain new and useful Process of Recovering Borax from Saline Liquors, of which the following is a specification.

The invention relates to a process of recovering borax (sodium tetraborate decahydrate) from saline liquors containing the same and particularly from the brines of the alkali lakes of the western United States.

An object of the invention is to provide a cheap and economical process for recovering borax from saline liquors containing the same, in a crude state, sufficiently pure to be economically refined.

Another object of the invention is to provide a process whereby the speed of the crystallizing reaction of the borax is increased.

The invention possesses other advantageous features, some of which, with the foregoing, will be set forth at length in the following description, where we shall outline in full that form of the process of our invention which we have selected for the purpose of description. We shall describe the process as applied to the brine of Searles Lake in California, but it is to be understood that the process is not limited to this particular brine.

Searles Lake brine contains sodium and potassium chloride, sulfates, carbonates, bicarbonates and borates, either as single or double salts. By the process of our invention, we are able to employ natural temperatures for evaporation and cooling and we prefer to use the temperature variations of day and night, which are considerable at Searles Lake, but in some instances it may be desirable to make use of the temperature variations of winter and summer. Artificial heating and cooling, however, may be employed when desired.

Searles Lake brine contains sodium tetraborate and sodium metaborate. In accordance with our invention, the brine is first pumped into a suitable concentration pond, in which it is subjected to evaporation to increase the concentration of the metaborate and tetraborate. The evaporation is prolonged for a sufficient time to accomplish the removal of from one-fourth to two-thirds or more of the water in the brine. During this concentration of the brine or liquor, some salts are crystallized out, the nature of these salts depending upon the temperature of the brine. The salts which crystallize out usually include sodium sulfate, sodium carbonate, sodium chloride and potassium sulfate, either as single or double salts.

After the desired concentration of the liquor is reached, the liquor is chilled, preferably to a temperature between 0° C. and 10° C., whereby the borax tends to crystallize out. The chilling may occur in the same pond in which evaporation occurred, but it is preferable to remove the liquor from the evaporation pond to a chilling pond. The reaction or reactions involved in the crystallization of borax from liquors of the above described type, appear to be slow ones, so that the borax crystallizes out very slowly. We have provided a process whereby the speed of the reaction or reactions may be greatly increased, thereby greatly increasing the rate of recovery of borax.

We have found that the speed of the reaction is affected by the extent of surface in contact with the liquor and that by increasing the surface, the speed of the reaction may be greatly increased. In accordance with our invention, we increase the surface by adding to the liquor a finely divided material possessing a large surface in proportion to its volume. We have found that many different finely divided materials may be employed for assisting in increasing the speed of the reaction, amongst them being finely divided borax, sodium chloride, silica, barium sulfate, glass wool and shredded filter paper, or other finely divided insoluble cellulose material. Of these various materials, we have obtained the best result with finely divided borax. The liquor containing the finely divided material is agitated, preferably continuously, thereby increasing the surface of the liquor in contact with the finely divided material, whereby the speed of the reaction is increased. The agitation is preferably accomplished by mechanical means, either by pumps or paddles and, in combination with the finely divided material, operates to greatly increase the speed of the reaction or reactions. The borax is crystallized out, together with certain impurities such as sodium chloride, sodium carbonate, sodium sulfate and potassium sulfate, either as single or double salts, and after being separated from the remaining liquor, the crystallized salts are washed to wash out the impurities, leaving borax (sodium tetraborate decahydrate) in commercial form.

We claim:

1. The process of recovering borax from liquors containing the same and other salts which comprises evaporating the liquor to crystallize out other salts and increase the concentration of metaborate and tetraborate, separating the liquor from the deposited crystals, chilling the liquor and agitating the chilled liquor in contact with a finely divided material whereby borax is rapidly crystallized out.

2. The process of recovering borax from liquors containing the same and other salts which comprises evaporating the liquor to crystallize out other salts and increase the concentration of metaborate and tetraborate, separating the liquor from the deposited crystals, chilling the liquor, adding finely divided material to the liquor and agitating the liquor in contact with the finely divided material, whereby borax is rapidly crystallized out.

3. The process of recovering borax from liquors containing the same and other salts which comprises evaporating the liquor to crystallize out other salts and increase the concentration of metaborate and tetraborate, separating the liquor from the deposited crystals, chilling the liquor, agitating the chilled liquor in contact with a finely divided material whereby borax and other salts are rapidly crystallized out, separating the crystals from the liquor and washing out the other salts from the crystals.

4. The process of recovering borax from liquors containing the same and other salts which comprises evaporating the liquor to crystallize out other salts and increase the concentration of metaborate and tetraborate, separating the liquor from the deposited crystals, chilling the liquor, whereby borax tends to crystallize out, and agitating the liquor in contact with a large surface to increase the speed of the crystallizing reaction.

5. The process of recovering borax from a liquor containing borax and metaborate, which comprises chilling the liquor, whereby borax tends to crystallize out and agitating the chilled liquor in contact with a large surface, whereby the speed of the crystallizing reaction is increased.

In testimony whereof, we have hereunto set our hands.

ALFRED W. GAUGER.
HENRY HERMAN STORCH.